US009933895B2

(12) United States Patent
Ichihara

(10) Patent No.: US 9,933,895 B2
(45) Date of Patent: Apr. 3, 2018

(54) ELECTRONIC DEVICE, CONTROL METHOD FOR THE SAME, AND NON-TRANSITORY COMPUTER-READABLE STORAGE MEDIUM

(71) Applicant: CANON KABUSHIKI KAISHA, Tokyo (JP)

(72) Inventor: Atsushi Ichihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 14/989,691

(22) Filed: Jan. 6, 2016

(65) Prior Publication Data
US 2016/0202840 A1 Jul. 14, 2016

(30) Foreign Application Priority Data
Jan. 9, 2015 (JP) .................................. 2015-003614

(51) Int. Cl.
G06F 3/041 (2006.01)
G06F 3/044 (2006.01)
G06F 3/0484 (2013.01)
G06F 3/0488 (2013.01)

(52) U.S. Cl.
CPC ............ *G06F 3/0418* (2013.01); *G06F 3/044* (2013.01); *G06F 3/0488* (2013.01); *G06F 3/04842* (2013.01); *G06F 3/04847* (2013.01); *G06F 2203/04108* (2013.01)

(58) Field of Classification Search
None
See application file for complete search history.

(56) References Cited

U.S. PATENT DOCUMENTS

| 2008/0012835 | A1* | 1/2008 | Rimon | G06F 3/038 345/173 |
|---|---|---|---|---|
| 2009/0153438 | A1* | 6/2009 | Miller | G06F 3/0488 345/55 |
| 2014/0098059 | A1* | 4/2014 | Ichikawa | G06F 3/0416 345/174 |
| 2015/0109243 | A1* | 4/2015 | Jun | G06F 3/044 345/174 |

FOREIGN PATENT DOCUMENTS

JP 2009-182590 A 8/2009

* cited by examiner

*Primary Examiner* — Jennifer Mehmood
*Assistant Examiner* — Krishna Neupane
(74) *Attorney, Agent, or Firm* — Canon USA, Inc., IP Division

(57) ABSTRACT

A touch sensor driver circuit drives a capacitive touch sensor to detect the presence of an operation performed with a conductive member and detects a position of the operation. A controller performs processing corresponding to the operation on the touch sensor with the conductive member. In a case where detection of a capacitance greater than or equal to a threshold in an edge area of a sensor area of the capacitive touch sensor and a touch operation in a central area that is the sensor area excluding the edge area occur at the same time, the controller ignores the touch operation.

19 Claims, 7 Drawing Sheets

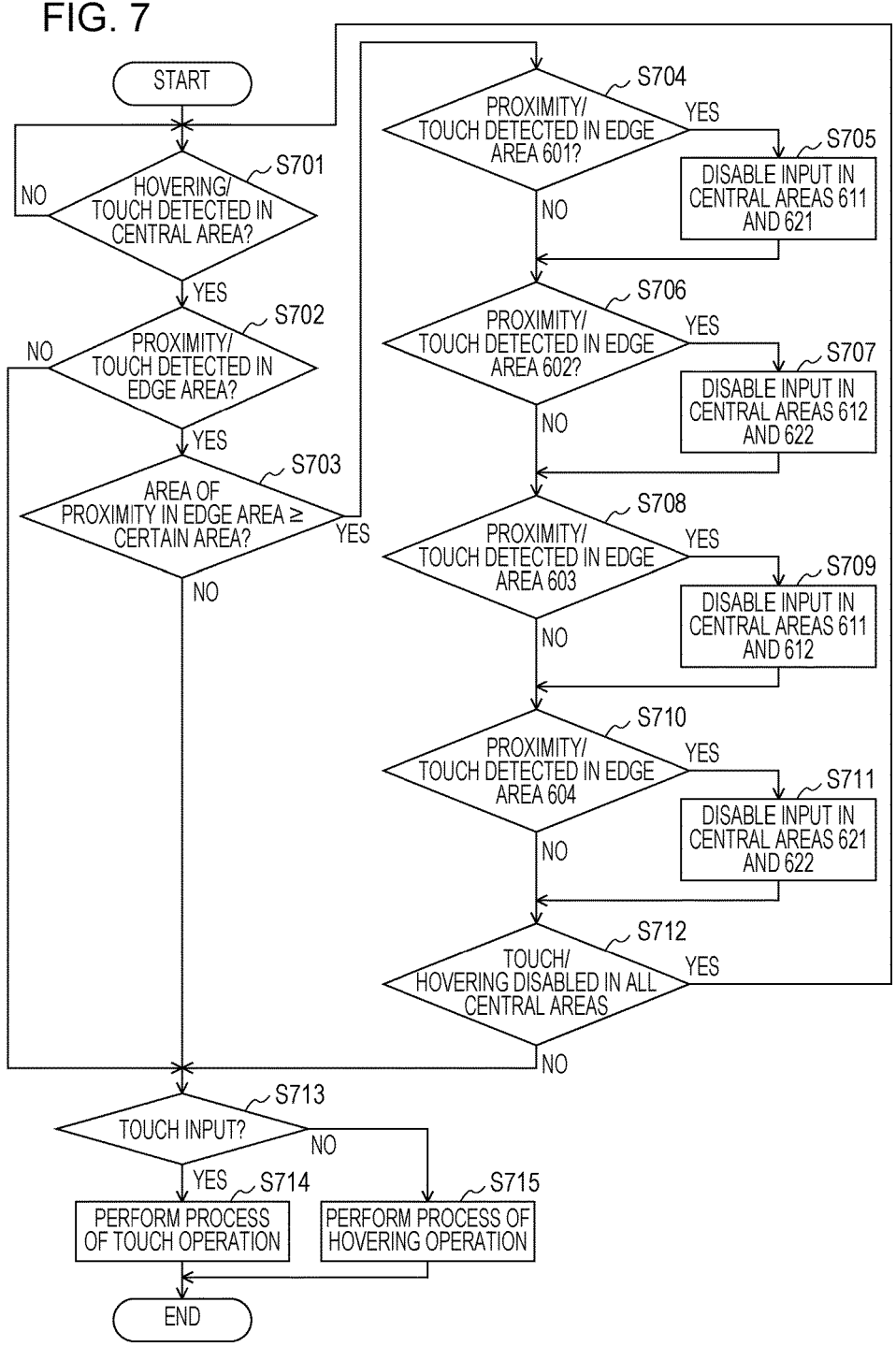

ELECTRONIC DEVICE, CONTROL METHOD FOR THE SAME, AND NON-TRANSITORY COMPUTER-READABLE STORAGE MEDIUM

BACKGROUND

Field

Aspects of the present invention generally relate to an electronic device including a touch sensor such as a touch panel, a control method for the same, and a non-transitory computer-readable storage medium.

Description of the Related Art

Recently, a display monitor such as a liquid crystal display included in devices such as mobile phones and digital cameras has become larger in pursuit of ease of viewing. In addition, such devices have come to include a touch panel in place of operation members such as buttons.

As the display monitor becomes larger to be substantially as large as the device, it is more likely that the fingers holding the device are placed on or above the display monitor. As a result, a touch sensor may erroneously detect a touch, and the device may perform an unintended action.

Japanese Patent Laid-Open No. 2009-182590 describes a configuration for an image capturing apparatus in which an operation button is disposed in the vicinity of a touch-panel-equipped display monitor. The configuration is such that when a touch operation on an area of the touch panel close to the operation button coincides with an operation of the operation button, the operation of the operation button is disabled. It is also described that if an area of a touch operation on the touch panel is greater than or equal to a certain area, the operation of the operation button located near the area of the touch operation is disabled. In addition, it is also described that when a touch operation on the touch panel is detected at two or more points, the operation of the operation button located near the area of the touch operation is disabled. With the related art disclosed in Japanese Patent Laid-Open No. 2009-182590, an erroneous operation may be performed depending on how the device is held and how a button located near the display monitor is operated.

SUMMARY

Aspects of the present invention generally provide an electronic device for avoiding operation difficulty and erroneous operation, a control method for the same, and a non-transitory computer-readable storage medium.

According to an aspect of the present invention, an electronic device includes a capacitive touch sensor including a sensor area, a processor configured to perform, upon detection by the capacitive touch sensor of a capacitance increase greater than or equal to a first threshold, processing corresponding to a touched position, and a controller configured to perform control to restrict the processing corresponding to the touched position in a case where a certain condition is satisfied even when the capacitive touch sensor detects the capacitance increase greater than or equal to the first threshold, the certain condition including a capacitance increase greater than or equal to a second threshold being detected in an edge area of the sensor area of the capacitive touch sensor, the second threshold being less than the first threshold.

Further features of the present disclosure will become apparent from the following description of exemplary embodiments with reference to the attached drawings.

BRIEF DESCRIPTION OF THE DRAWINGS

FIG. 7 is a flowchart illustrating a touch control process according to the third exemplary embodiment.

DESCRIPTION OF THE EMBODIMENTS

Exemplary embodiments of aspects of the present invention will be described in detail below with reference to the accompanying drawings.

It is to be noted that the following exemplary embodiments are merely examples for implementing aspects of the present invention and can be appropriately modified or changed depending on individual constructions and various conditions of apparatuses to which the aspects of the present invention are applied. Thus, aspects of the present invention are in no way limited to the following exemplary embodiments.

An erroneous operation may be performed depending on how a device is held and how a button located in the vicinity of a display monitor is operated. For example, when the user firmly holds the device with their hand, the user often applies the force with the fingertips. As a result, a fingertip often touches the surface of the display monitor with the second joint and other parts of the finger being located slightly above the surface. The second joint of the fingers holding the device is often located near the outer periphery of the display monitor. If a touch panel fails to detect the state where a finger is located above the surface, such a failure may result in an erroneous operation. In addition, when an image such as an icon to be operated is displayed at or close to a position where one of the fingers holding the device is located, it is difficult to perform a touch operation on the icon. A method for avoiding such operation difficulty and erroneous operation will be described below.

First Exemplary Embodiment

Figure 1:
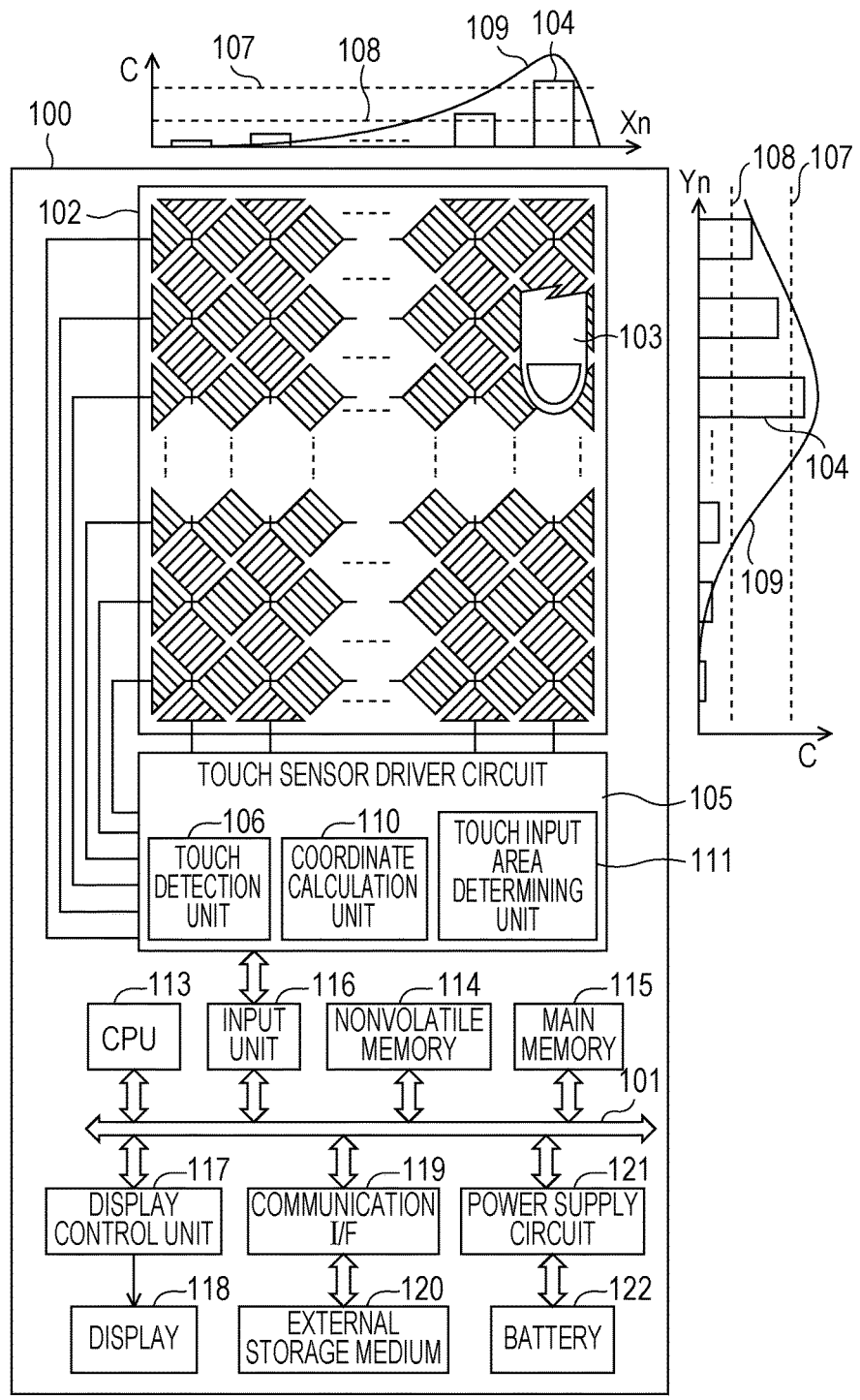
FIG. 1 is a schematic block diagram illustrating a configuration of an electronic device according to a first exemplary embodiment.

FIG. 1 is a schematic block diagram illustrating a configuration of an electronic device 100 according to a first exemplary embodiment. The electronic device 100 illustrated in FIG. 1 is a portable device that can be held by the user with their hand. The electronic device 100 may be, for example, an image capturing apparatus including an imaging device, a portable telephone terminal such as a smartphone, a tablet computer, or a portable game machine.

The electronic device 100 illustrated in FIG. 1 includes a central processing unit (CPU) 113, a nonvolatile memory 114, a main memory 115, an input unit 116, a display control unit 117, a communication interface (I/F) 119, and a power supply circuit 121, which are connected to an internal bus 101. The CPU 113, the nonvolatile memory 114, the main memory 115, the input unit 116, the display control unit 117, the communication I/F 119, and the power supply circuit 121 that are connected to the internal bus 101 are capable of mutually exchanging data via the internal bus 101.

The electronic device 100 further includes a capacitive touch sensor 102 including sensor elements. A conductive object 103, such as a finger or a stylus, serves as a member used to perform an operation. The capacitive touch sensor 102 generates a capacitance 104 between the surface thereof and the conductive object 103 in response to the proximity of the conductive object 103 at or within a certain distance or a touch operation with the conductive object 103 and detects a two-dimensional position of the touch operation.

The electronic device 100 further includes a touch sensor driver circuit 105. The touch sensor driver circuit 105 includes a touch detection unit 106, a coordinate calculation unit 110, and a touch input area determining unit 111. The touch detection unit 106 detects a touch operation by comparing the capacitance 104 between the surface of the capacitive touch sensor 102 and the conductive object 103 with a touch detection threshold 107. The touch detection unit 106 also detects the proximity (hovering) by comparing the capacitance 104 with a proximity detection threshold 108. The coordinate calculation unit 110 calculates, for example, a center of gravity 109 from the capacitances 104 of the sensor elements to calculate coordinates of a touched position or a hovering position. In the case where the sensor elements of the capacitive touch sensor 102 are arranged in an array of two dimensions or greater, the coordinate calculation unit 110 calculates the center of gravity 109 for each axis of the array. The touch input area determining unit 111 determines dimensions of the conductive object 103 from a distribution of the capacitances 104 on the capacitive touch sensor 102.

The nonvolatile memory 114 stores, for example, various programs causing the CPU 113 to operate. The main memory 115 is constituted by, for example, a random access memory (RAM). For example, the CPU 113 controls each unit of the electronic device 100 in accordance with a program stored in the nonvolatile memory 114 by using the main memory 115 as its workspace. A control program that runs on the CPU 113 to control each unit of the electronic device 100 is not necessarily stored in the nonvolatile memory 114. The control program may be stored in advance in a memory (not illustrated), for example.

The input unit 116 accepts a touch operation performed by the user on the capacitive touch sensor 102 and supplies a control signal indicating contents of the operation (such as a touched position) to the CPU 113. Based on the control signal generated by the input unit 116 in response to the user operation on the capacitive touch sensor 102, the CPU 113 controls each unit of the electronic device 100 in accordance with the program. In this way, the electronic device 100 carries out a function corresponding to the user operation.

The display control unit 117 outputs, to a display 118, a display signal for causing the display 118 to display an image. Specifically, the CPU 113 generates a display control signal in accordance with the program and supplies the display control signal to the display control unit 117. The display control unit 117 generates a display signal on the basis of the display control signal supplied from the CPU 113 and supplies the display signal to the display 118. For example, based on a display control signal generated by the CPU 113, the display control unit 117 causes the display 118 to display a graphical user interface (GUI) screen, which serves as a GUI.

The capacitive touch sensor 102 is typically stacked on the screen of the display 118 to be an integral device. For example, a light transmittance of the capacitive touch sensor 102 is set to a level at which the presence of the capacitive touch sensor 102 does not interfere with display of the display 118, and the capacitive touch sensor 102 is disposed on the display surface of the display 118. Then, input coordinates on the capacitive touch sensor 102 are associated with display coordinates on the display 118. Such an association allows the user to input various instructions to the CPU 113 as if the user were directly operating an object displayed at a given screen position of the display 118.

The communication I/F 119 reads data from and writes data to an external storage medium 120, such as a memory card, under control of the CPU 113. The memory card, which serves as the external storage medium 120, is removably inserted into the electronic device 100.

The power supply circuit 121 serves as a power supply and supplies each unit of the electronic device 100 with output power of a battery 122 upon a power supply switch (not illustrated) is turned on.

All of or any of functions of the touch detection unit 106, the coordinate calculation unit 110, and the touch input area determining unit 111 of the touch sensor driver circuit 105 may be incorporated into the CPU 113. For ease of understanding, a description of an operation is given below, assuming that the CPU 113 includes the functions of the touch detection unit 106, the coordinate calculation unit 110, and the touch input area determining unit 111.

Herein, operations performed on the capacitive touch sensor 102 are referred to as follows. Specifically, touching the capacitive touch sensor 102 with a finger or a stylus is hereinafter referred to as a "touch-down". The state where a finger or a stylus is in contact with the capacitive touch sensor 102 is hereinafter referred to as a "touch-on". Moving a finger or a stylus while keeping the finger or the stylus in contact with the capacitive touch sensor 102 is hereinafter referred to as a "touch-move". Lifting a finger or a stylus that has been in contact with the capacitive touch sensor 102 from the capacitive touch sensor 102 is hereinafter referred to as a "touch-up". The state where nothing is in contact with the capacitive touch sensor 102 is hereinafter referred to as a "touch-off".

A "touch-down" on the capacitive touch sensor 102 followed by a "touch-move" over a certain distance and then a "touch-up" is referred to as a stroke. A quick stroke is referred to as a flick. A flick refers to an operation of quickly moving a finger over a certain distance while keeping the finger in contact with the capacitive touch sensor 102 and then lifting the finger from the capacitive touch sensor 102. That is, a flick is an operation of quickly moving the finger along the capacitive touch sensor 102 like lightly striking the capacitive touch sensor 102 with the finger.

The input unit 116 notifies, via the internal bus 101, the CPU 113 of the presence of any of these operations and the coordinates of the position of the capacitive touch sensor 102 touched with the finger or the stylus. The CPU 113 determines which operation has been performed on the capacitive touch sensor 102 on the basis of these pieces of information supplied from the input unit 116. That is, the CPU 113 is (or the input unit 116 and the CPU 113 are) capable of detecting and identifying each of the aforementioned operations performed on the capacitive touch sensor 102. As for a "touch-move", the CPU 113 is capable of determining, for each of a vertical component and a horizontal component of the capacitive touch sensor 102, a direction in which the finger or the stylus is moved on the capacitive touch sensor 102 on the basis of a change in the coordinates of the touched position. When the CPU 113 detects a "touch-up" that follows a "touch-move" performed over a certain distance or greater at a certain speed or greater, the CPU 113 determines that a flick has been performed. In addition, when the CPU 113 detects a "touch move" performed over a certain distance or greater at a speed less than a certain speed, the CPU 113 determines that a drag has been performed.

Figure 2:
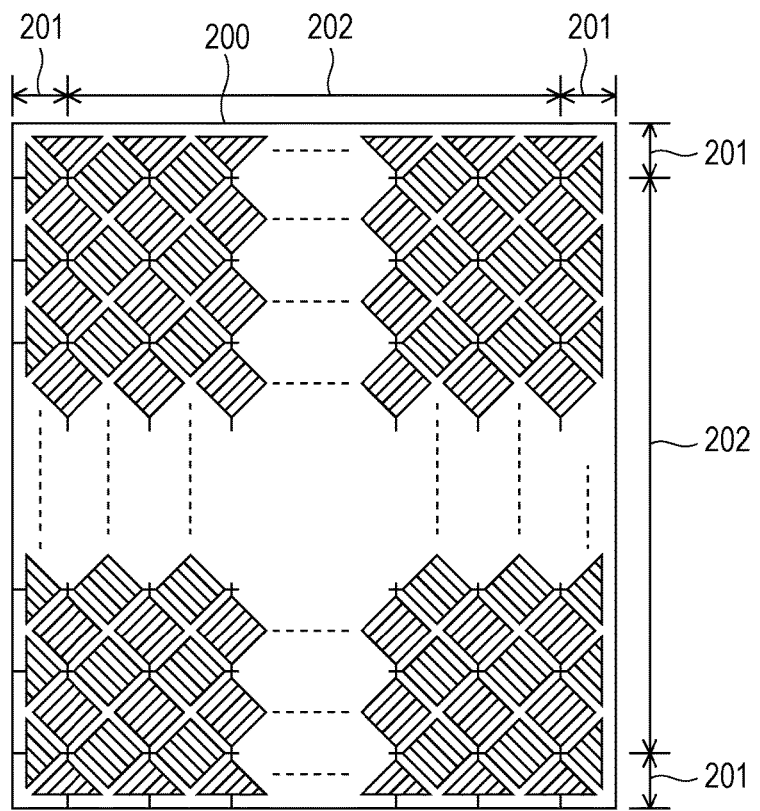
FIG. 2 is a plan view illustrating a configuration of a capacitive touch sensor according to the first exemplary embodiment.
Figure 3A:
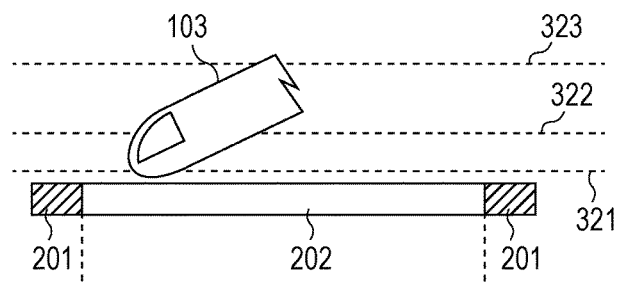
FIGS. 3A and 3B are schematic diagrams illustrating a relationship between a touch on the capacitive touch sensor and capacitance.
Figure 3B:
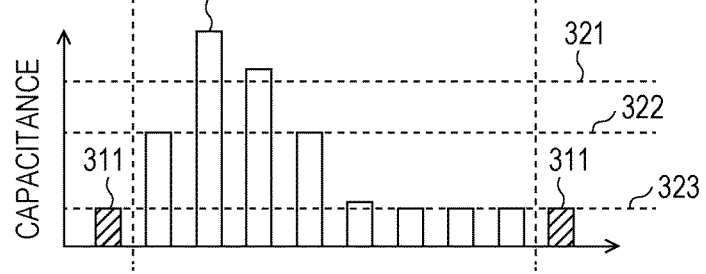
Figure 4:
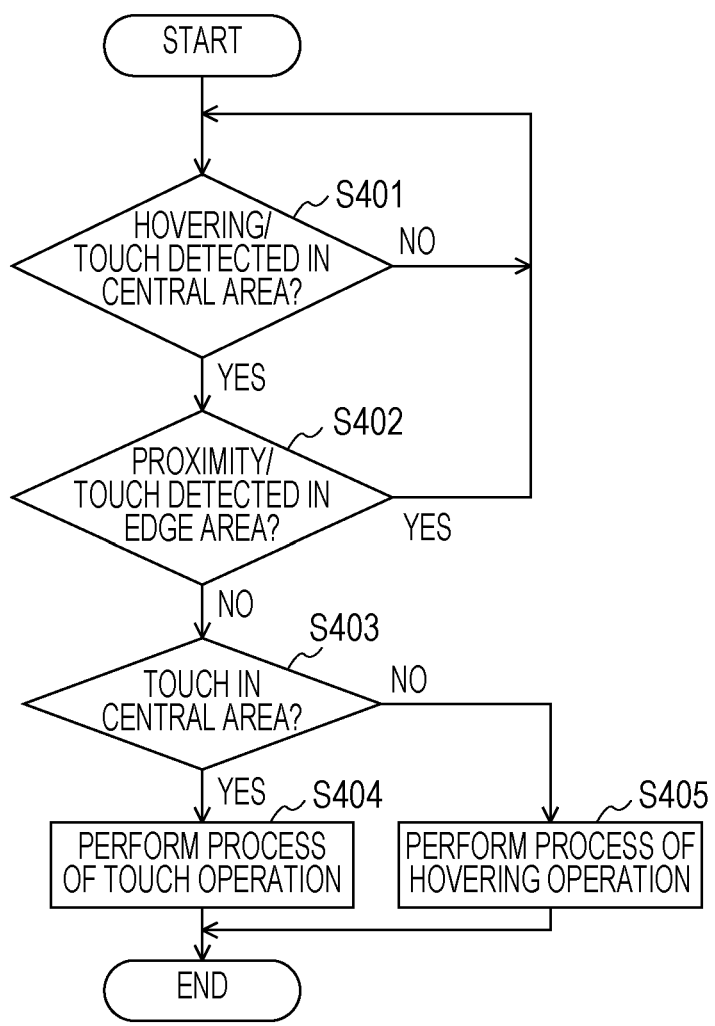
FIG. 4 is a flowchart illustrating a touch control process according to the first exemplary embodiment.

Referring now to FIGS. 2 to 4, an operation for restricting execution of a function corresponding to a touch operation performed in an edge area of the capacitive touch sensor 102 will be described.

FIG. 2 is a plan view illustrating an example of an arrangement of the sensor elements of the capacitive touch sensor 102. In a sensor area 200 of the capacitive touch sensor 102, a plurality of touch sensor elements that constitute the capacitive touch sensor 102 are arranged in a two-dimensional array. The sensor area 200 is divided into an edge area 201 and a central area 202 in terms of its operation. The edge area 201 is located at the periphery of the sensor area 200 and is an area where it is difficult to ensure a sufficient area for a touch with a finger or the like. The central area 202 is an area of the sensor area 200 other than the edge area 201, in which a sufficient touch area is ensured. FIG. 2 illustrates the example in which the width of the edge area 201 is set to a width of one sensor element at upper, lower, left, and right edges; however, obviously, the width may be greater.

FIGS. 3A and 3B illustrates a correspondence between a lateral view of the capacitive touch sensor 102 and capacitances detected by the touch detection unit 106. Specifically, FIG. 3A illustrates relationships between distances of the conductive object 103 from the capacitive touch sensor 102 and thresholds 321, 322, and 323 for a detected capacitance. FIG. 3B illustrates relationships between the detected capacitance and the thresholds 321, 322, and 323.

A capacitance 310 indicates a capacitance detected by the sensor element located directly under a position where a touch input is given with the conductive object 103 on the capacitive touch sensor 102. A capacitance 311 indicates a capacitance detected, for the touch input with the conductive object 103, by the sensor element located in the edge area 201.

The thresholds 321, 322, and 323 become smaller in this order. The threshold 321 is a threshold for detecting a touch operation on the capacitive touch sensor 102. The threshold 322 is a threshold for detecting the proximity of the conductive object 103 to the capacitive touch sensor 102. In particular, the threshold 322 is a threshold for detecting whether a finger of the hand holding the electronic device 100 is located close to the capacitive touch sensor 102 in the edge area 201. This threshold 322 enables detection of the proximity of a non-fingertip portion, such as a junction of the finger holding the electronic device 100, when the user unintentionally touches the capacitive touch sensor 102 with their hand holding the electronic device 100. The threshold 323 is a threshold for detecting the proximity of the conductive object 103 to the capacitive touch sensor 102. In particular, the threshold 323 is a threshold for detecting a hovering state in which the conductive object 103 is located at a position that is separate from the capacitive touch sensor 102 by a distance greater than that corresponding to the threshold 322.

FIG. 4 is a flowchart illustrating an operation of a control process for disabling or ignoring a touch on or the proximity to the edge area 201. Each processing step in this flowchart is implemented as a result of the CPU 113 loading a program stored in the nonvolatile memory 114 to the main memory 115 and executing the program.

In step S401, the CPU 113 determines whether the capacitance 310 is greater than or equal to the threshold 323 in the central area 202. This step indicates determining whether the conductive object 103 is in a state of hovering or touching with respect to the capacitive touch sensor 102. If the CPU 113 determines that the capacitance 310 is greater than or equal to the threshold 323, the process proceeds to step S402. If the capacitance 310 is smaller than the threshold 323, the CPU 113 performs step S401 again.

In step S402, the CPU 113 determines whether a capacitance (the capacitance 311) detected in the edge area 201 is greater than or equal to the threshold 322. This step indicates detecting whether the conductive object 103 is a state of proximity or touching in the periphery portion of the capacitive touch sensor 102. If the CPU 113 determines that the capacitance 311 is greater than or equal to the threshold 322, the CPU 113 disables or ignores the touch (proximity) corresponding to the capacitance 311 (that is, restricts processing corresponding to the touch detected in step S401 in the central area 202), and the process returns to step S401. If the capacitance 311 is smaller than the threshold 322, the process proceeds to step S403.

In step S403, the CPU 113 determines whether the capacitance 310 detected in step S401 is greater than or equal to the threshold 321. This step indicates determining whether the operation detected in step S401 is a touch or hovering. If the capacitance 310 is greater than or equal to the threshold 321, the CPU 113 determines that the detected operation is a touch, and the process proceeds to step S404. If the capacitance 310 is smaller than the threshold 321, the CPU 113 determines that the detected operation is hovering, and the process proceeds to step S405.

In step S404, the CPU 113 performs processing corresponding to the "touch-on". The processing may be, for example, selecting an icon on the GUI. Upon an icon being selected, the CPU 113 displays a selection frame at the icon or executes a function assigned to the icon. That is, the CPU 113 executes a function assigned to the touched position (the position of the touch).

In step S405, the CPU 113 performs processing corresponding to the detected hovering. This processing may be, for example, marking an icon on the GUI or displaying a function guidance.

As is easily understood from the above description, according to the first exemplary embodiment, even when one of the fingers of the hand holding the electronic device 100 is in contact with the screen edge portion of the display monitor, the electronic device 100 ignores the touch and is able to perform processing corresponding to a touch operation on another portion. That is, even when a finger is unintentionally in contact with the edge portion of the display monitor, processing corresponding to such a "touch-on" with the finger can be avoided.

When the user holds the electronic device 100, the entire thumb of the hand holding the electronic device 100 is often placed on or over the display monitor. Even if the thumb is not in contact with the display monitor, the thumb is located very close to the display monitor. On the other hand, when the user performs a touch operation while holding the electronic device 100, the user often performs the touch operation with the thumb of their hand holding the electronic device 100. When a touch operation is performed, the second joint of the thumb is located above the surface of the display monitor. Even if a finger is located above the surface of the display monitor, such a state may be erroneously determined as a touch or the proximity in the edge area 201 depending on a distance of the finger from the surface. However, in the first exemplary embodiment, the electronic device 100 is able to clearly determine whether the finger is used to hold the electronic device 100 or to perform a touch operation. Consequently, processing triggered by an unintended touch input or hovering input with a finger holding the electronic device 100 can be avoided, and an intended touch input or hovering input can be handled.

Second Exemplary Embodiment

Figure 5:
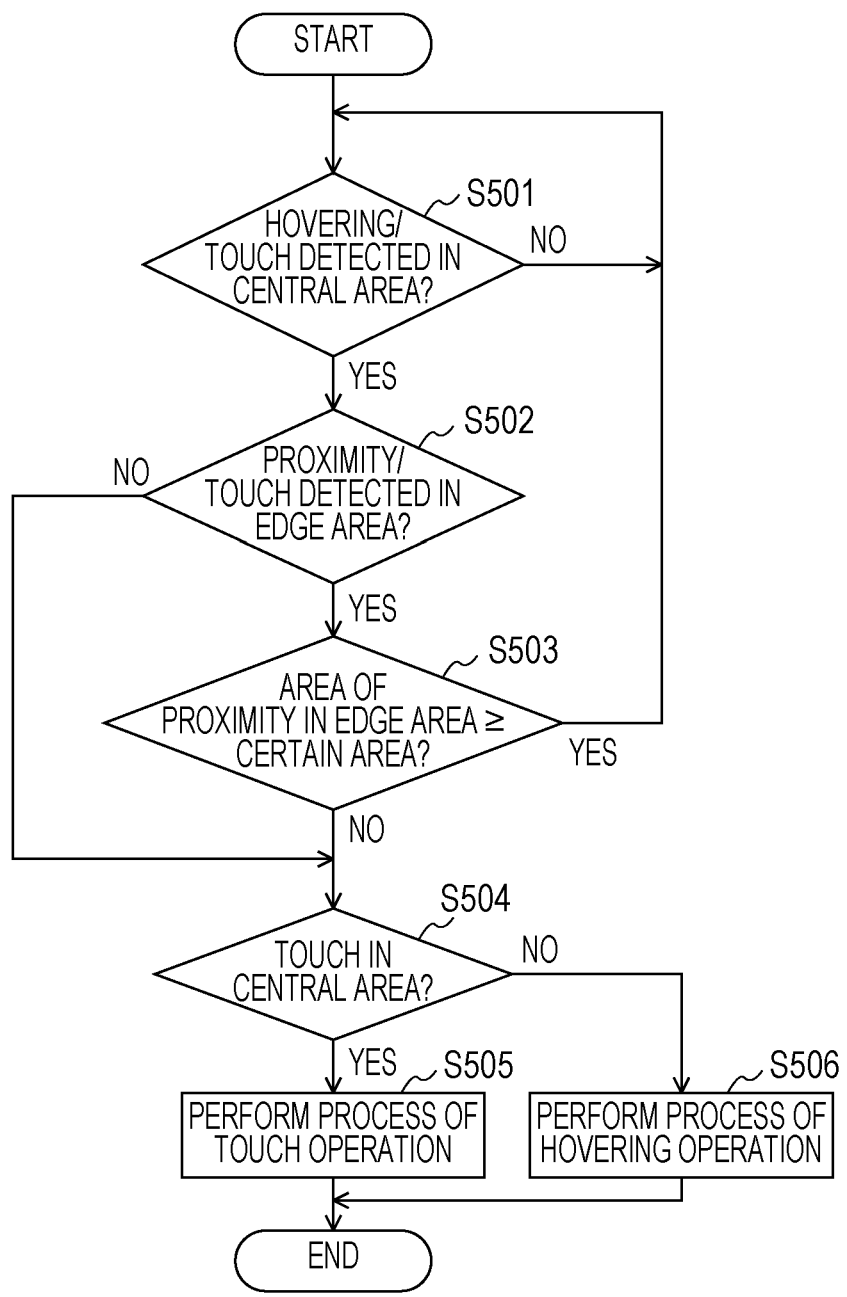
FIG. 5 is a flowchart illustrating a touch control process according to a second exemplary embodiment.

A control operation according to a second exemplary embodiment performed by the electronic device 100 illustrated in FIG. 1 will be described. FIG. 5 is a flowchart of the control operation for a touch or proximity in the edge area 201. Each processing step in this flowchart is implemented as a result of the CPU 113 loading a program stored in the nonvolatile memory 114 to the main memory 115 and executing the program.

In step S501, the CPU 113 determines whether the capacitance 310 is greater than or equal to the threshold 323 in the central area 202. This step indicates determining whether the conductive object 103 is in a hovering or touching state with respect to the capacitive touch sensor 102. If the CPU 113 determines that the capacitance 310 is greater than or equal to the threshold 323, the process proceeds to step S502. If the capacitance 310 is smaller than the threshold 323, the CPU 113 performs step S501 again.

In step S502, the CPU 113 determines whether a capacitance (the capacitance 311) detected in the edge area 201 is greater than or equal to the threshold 322. This step indicates detecting whether the conductive object 103 is in the proximity or touching state in the periphery portion of the capacitive touch sensor 102. If the CPU 113 determines that the capacitance 311 is greater than or equal to the threshold 322, the process proceeds to step S503. If the capacitance 311 is smaller than the threshold 322, the process proceeds to step S504.

In step S503, the CPU 113 determines whether an area where the proximity (or touch) is detected in the edge area 201 (specifically, an area where the capacitance 311 is greater than or equal to the threshold 322) is larger than or equal to a certain area. If the area where the proximity is detected is larger than or equal to the certain area, it can be determined that a finger holding the electronic device 100 is in contact with the display monitor. If the area is smaller than the certain area, it can be determined that the detected operation is a touch operation. If the area where the proximity is detected is larger than or equal to the certain area, the CPU 113 disables or ignores the touch (proximity) corresponding to the capacitance 311 (that is, restricts processing corresponding to the touch detected in the central area 202 in step S501), and the process returns to step S501. If the area is smaller than the certain area, the process proceeds to step S504.

In step S504, the CPU 113 determines whether the capacitance 310 detected in step S501 is greater than or equal to the threshold 321. This step indicates determining whether the operation detected in step S501 is a touch or hovering. If the capacitance 310 is greater than or equal to the threshold 321, the CPU 113 determines that the detected operation is a touch, and the process proceeds to step S505. If the capacitance 310 is smaller than the threshold 321, the CPU 113 determines that the detected operation is hovering, and the process proceeds to step S506.

In step S505, the CPU 113 performs processing corresponding to the "touch-on". The processing may be, for example, selecting an icon on the GUI.

In step S506, the CPU 113 performs processing corresponding to the detected hovering. This processing may be, for example, marking an icon on the GUI or displaying a function guidance.

Through the control operation illustrated in FIG. 5, even when one of the fingers of the hand holding the electronic device 100 is in contact with the screen edge portion of the display monitor, the electronic device 100 ignores the touch and is able to perform processing corresponding to a touch operation on another portion. That is, even when a finger is unintentionally in contact with the edge portion of the display monitor, processing corresponding to such a "touch-on" with the finger can be avoided.

In addition, when the user holds the electronic device 100, the entire thumb of the hand holding the electronic device 100 is often placed on or above the display monitor. On the other hand, when the user performs a touch operation while holding the electronic device 100, the user often performs the touch operation with their thumb of the hand holding the electronic device 100. In such a case, the proximity is detected in an area substantially equal to the width of the finger in the edge area 201. In the second exemplary embodiment, the electronic device 100 is able to clearly determine whether the finger is used to hold the electronic device 100 or to perform a touch operation. Consequently, processing triggered by an unintended touch input or hovering input with a finger holding the electronic device 100 can be avoided, and an intended touch input or hovering input can be handled.

In the second exemplary embodiment, different values may be set as each of the thresholds 321, 322, and 323 in the central area 202 and the edge area 201.

A method used by the CPU 113 to determine whether the area where the proximity is detected in the edge area 201 is larger than or equal to the certain area in step S503 is not limited to a particular method.

Third Exemplary Embodiment

A control operation according to a third exemplary embodiment performed by the electronic device 100 illustrated in FIG. 1 will be described. In this control operation, the CPU 113 selects a sensor area to which control for restricting a touch operation is to be applied, in accordance with a position of a touch or proximity detected by the coordinate calculation unit 110 and a range where the proximity is detected by the touch input area determining unit 111.

Figure 6:
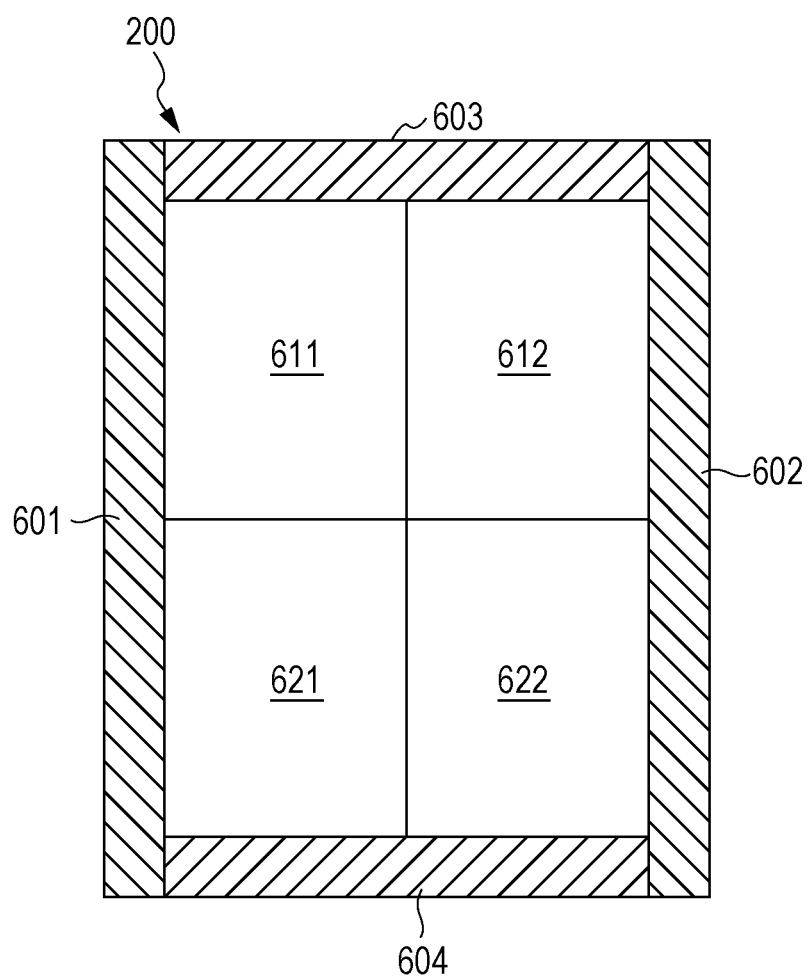
FIG. 6 is a diagram illustrating divisional areas of the capacitive touch sensor to describe a third exemplary embodiment.

FIG. 6 illustrates an example of how the sensor area 200 of the capacitive touch sensor 102 is divided. Edge areas 601, 602, 603, and 604 are set respectively at the left, right, upper, and lower edges of the sensor area 200. The rest of the area, i.e., the central portion, is vertically and horizontally divided into four central areas 611, 612, 621, and 622 in total. The touch sensor driver circuit 105 is capable of determining an area in which a capacitance is detected by the touch detection unit 106 from among the aforementioned areas.

FIG. 7 is a flowchart illustrating a control operation for a touch or proximity in the edge areas 601 to 604 according to the third exemplary embodiment. Each processing step in this flowchart is implemented as a result of the CPU 113 loading a program stored in the nonvolatile memory 114 to the main memory 115 and executing the program.

In step S701, the CPU 113 determines whether a capacitance greater than or equal to the threshold 323 is detected in any of the central areas 611, 612, 621, and 622. This step indicates determining whether the conductive object 103 is in the hovering or touching state with respect to the capacitive touch sensor 102. If a capacitance greater than or equal to the threshold 323 is detected in any of the central areas 611, 612, 621, and 622, the process proceeds to step S702; otherwise, the CPU 113 performs step S701 again.

In step S702, the CPU 113 determines whether any of capacitances detected in the edge areas 601 to 604 is greater than or equal to the threshold 322. This step indicates detecting whether the conductive object 103 is in the proximity or touching state at the periphery portion of the capacitive touch sensor 102. If the CPU 113 determines that any of the capacitances detected in the edge areas 601 to 604 is greater than or equal to the threshold 322, the process proceeds to step S703; otherwise, the process proceeds to step S713.

In step S703, the CPU 113 determines whether an area where the proximity (or touch) is detected in the edge areas 601 to 604 (specifically, an area where the capacitance 311 is greater than or equal to the threshold 322) is larger than or equal to a certain area. If the area where the proximity is detected is larger than or equal to the certain area, it can be determined that a finger holding the electronic device 100 is in contact with the display monitor. If the area is smaller than the certain area, it can be determined that the detected operation is a touch operation. If the CPU 113 determines that the area where the proximity is detected is larger than or equal to the certain area, the process proceeds to step S704. If the area is smaller than the certain area, the process proceeds to step S713.

In step S704, the CPU 113 determines whether the proximity or touch detected in step S702 is detected in the edge area 601. If the CPU 113 determines that the proximity or touch is detected in the edge area 601, the process proceeds to step S705; otherwise, the process proceeds to step S706. In step S705, the CPU 113 disables or ignores (restricts) hovering/touch input in the central areas 611 and 621. The process then proceeds to step S706.

In step S706, the CPU 113 determines whether the proximity or touch detected in step S702 is detected in the edge area 602. If the CPU 113 determines that the proximity or touch is detected in the edge area 602, the process proceeds to step S707; otherwise, the process proceeds to step S708. In step S707, the CPU 113 disables or ignores (restricts) hovering/touch input in the central areas 612 and 622. The process then proceeds to step S708.

In step S708, the CPU 113 determines whether the proximity or touch detected in step S702 is detected in the edge area 603. If the CPU 113 determines that the proximity or touch is detected in the edge area 603, the process proceeds to step S709; otherwise, the process proceeds to step S710. In step S709, the CPU 113 disables or ignores (restricts) hovering/touch input in the central areas 611 and 612. The process then proceeds to step S710.

In step S710, the CPU 113 determines whether the proximity or touch detected in step S702 is detected in the edge area 604. If the CPU 113 determines that the proximity or touch is detected in the edge area 604, the process proceeds to step S711; otherwise, the process proceeds to step S712. In step S711, the CPU 113 disables or ignores (restricts) hovering/touch input in the central areas 621 and 622. The process then proceeds to step S712.

In step S712, the CPU 113 determines whether all the user operations detected in the central areas 611, 612, 621, and 622 are disabled. If it is determined that all the user operations are disabled, the process returns to step S701. If there is an effective input, the process proceeds to step S713.

In step S713, the CPU 113 determines whether the capacitance detected in step S701 is greater than or equal to the threshold 321. A user operation that involves the capacitance that is greater than or equal to the threshold 321 is a touch. When the capacitance is smaller than the threshold 321, the detected user operation is hovering. If the capacitance is greater than or equal to the threshold 321, the CPU 113 determines that the detected user operation is a touch, and the process proceeds to step S714; otherwise, the CPU 113 determines that the detected user operation is hovering, and the process proceeds to step S715.

In step S714, the CPU 113 performs processing corresponding to the "touch-on". The processing may be, for example, selecting an icon on the GUI.

In step S715, the CPU 113 performs processing corresponding to the detected hovering. This processing may be, for example, marking an icon on the GUI or displaying a function guidance.

In the case of a touch switch capable of detecting simultaneous multiple touches, it may be determined, for each of user operations detected in step S701, whether the user operation is a touch or hovering in step S713. In this case, the CPU 113 performs step S714 for the user operation that is determined to be a touch and performs step S715 for the user operation that is determined to be hovering.

Through the control operation illustrated in FIG. 7, even when one of fingers of the hand holding the electronic device 100 is in contact with the screen edge portion of the display monitor, the electronic device 100 ignores the touch and is able to perform processing corresponding to a touch operation on another portion. That is, even when a finger is unintentionally in contact with an edge portion of the display monitor, processing corresponding to such a "touch-on" with the finger can be avoided.

In addition, when the user holds the electronic device 100, the entire thumb of the hand holding the electronic device 100 is often placed on or above the display monitor. On the other hand, when the user performs a touch operation while holding the electronic device 100, the user often performs the touch operation with their thumb of the hand holding the electronic device 100. In such a case, the proximity is detected in an area substantially equal to the width of the finger in the edge areas 601 to 604. The place where a finger of the hand holding the electronic device 100 is in contact with the display monitor is often in the vicinity of each of the outer periphery sides of the display monitor. In the third exemplary embodiment, the electronic device 100 is able to clearly determine whether the finger is used to hold the electronic device 100 or to perform a touch operation. Consequently, processing triggered by an unintended touch input or hovering input with a finger holding the electronic device 100 can be avoided, and an intended touch input or hovering input can be handled.

The width of the edge areas 601, 602, 603, and 604 is not limited to a width equivalent to one sensor element. The description has been given by assuming that the threshold 321 is the same value in the central areas 611, 612, 621, and 622 and the edge areas 601 to 604 and that the threshold 322 is the same value in the central areas 611, 612, 621, and 622 and the edge areas 601 to 604; however, different values may be used as each of the thresholds 321 and 322 in the central areas 611, 612, 621, and 622 and the edge areas 601 to 604.

The edge areas 601, 602, 603, and 604 are set along the four sides of the sensor area 200; however, the control illustrated in FIG. 7 may be applied by setting peripheral areas corresponding to one or a plurality of specific sides as the edge areas. Also, the description has been given of the example of dividing the central area into four areas; however, other division examples may be employed.

A method used by the CPU 113 in step S703 to determine whether the area where the proximity is detected in the edge areas 601 to 604 is greater than or equal to the certain area is not limited to a particular method.

The example has been described in which a touch is ignored if YES in step S402 in the first exemplary embodiment, if YES in step S503 in the second exemplary embodiment, and in steps S705, S707, S709, and S711 in the third exemplary embodiment; however, restriction may be implemented in a way other than ignoring. For example, a configuration may be made such that processing, such as selecting an item with a touch or hovering, that does not influence an important operation, such as changing a device setting, capturing an image, deleting an image, transferring data, or printing, is accepted. This configuration is made in order to prioritize the user's operation feeling for the operation intentionally performed by the user because such an operation does not cause any inconvenience or an inconvenience caused by such an operation is minor even if the operation is not intended by the user. On the other hand, an instruction with touching or hovering for instructing an operation, such as changing a device setting, capturing an image, deleting an image, transferring data, or printing, is not accepted. In addition, if YES in step S402 in the first exemplary embodiment, if YES in step S503 in the second exemplary embodiment, or in step S705, S707, S709, or S711 in the third exemplary embodiment, a warning (for example, by display, sound, or light notification) indicating that a touch operation is restricted may be issued.

Further, in the first to third exemplary embodiments described above, the conditions for restricting the processing corresponding to a touch by detecting a capacitance greater than or equal to the threshold 322 in the edge area may further include a condition that a capacitance greater than or equal to the threshold 322 is detected in a continuous space from the edge area to the position where the touch is detected in the central area. When the user unintentionally touches the touch sensor of the device with their hand, the entire finger is often in contact with the touch sensor instead of keeping the finger upright (instead of bending the junction of the finger). On the other hand, when the user intentionally operates the touch sensor, the user often performs the operation with a finger of the hand other than the hand holding the device or, in the case of performing the operation with a finger of the hand holding the device, by bending the first or second junction to keep the finger upright. In this case, the capacitance is detected independently in the central area and is not detected in a continuous range up to the edge area. Even in the case of an intended operation, the user may intentionally touch the edge area of the touch sensor with the other hand. Restricting the touch operation in such a case may be not good for the user in terms of the operation feeling. Accordingly, even in the case where touch or hovering is detected in the central area and a capacitance greater than or equal to the threshold 322 is also detected in the edge area, an operation through the touch or hovering detected in the central area is accepted unless the touch or hovering is detected in the central area continuously from the edge area. This configuration is made because it is estimated that the touch or hovering detected in the central area is due to a factor other than a factor for which the capacitance greater than or equal to the threshold 322 is detected in the edge area (that is, the touch or hovering detected in the central area is not due to the hand holding the electronic device 100).

A description regarding processing performed when touch/hovering is detected only in an area other than the central area (i.e., only in the edge area) is omitted in the first to third exemplary embodiments described above; however, in this case, there may be cases where the user intentionally performs a touch operation in the edge area. Accordingly, the touch operation is not restricted and processing corresponding to the touch or hovering is performed in the case where a function is assigned to the position of the touch or hovering in the edge area.

Note that the various thresholds (the thresholds 321, 322, and 323) described above may be previously set capacitances or thresholds for measuring an increase (change) from a reference value. For example, calibration is performed by using, as the reference value, a capacitance detected at the startup or at a timing at which any touch operation is not performed. If a capacitance obtained by adding the various thresholds described above to the reference value is detected, it is determined that the thresholds are reached (there is an increase in the capacitance greater than or equal to the thresholds).

Note that the control performed by the CPU 113 may be implemented by a single piece of hardware, or processes may be distributed to a plurality of pieces of hardware to control the entire electronic device 100.

Aspects of the present invention have been described in accordance with their exemplary embodiments; however, the aspects of the present invention are not limited to these specific exemplary embodiments and various embodiments within a scope not departing from the essence of the aspects of the invention are also encompassed. Further, each of the exemplary embodiments described above is merely an embodiment of the aspects of the present invention, and such exemplary embodiments may be combined as appropriate.

In addition, the case of applying aspects of the present invention to the electronic device 100 has been described in the first to third exemplary embodiments above. The aspects of the present invention are not limited to these examples and are applicable to apparatuses including a touch sensor capable of detecting multiple touches. Specifically, aspects of the present invention are applicable to an apparatus, such as a tablet device, a smartphone, a computer, a scanner/printer device including a touch sensor, and a portable game machine.

According to the exemplary embodiments of aspects of the present invention, an erroneous operation caused by a hand holding a touch panel may be avoided.

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-003614, filed Jan. 9, 2015, which is hereby incorporated by reference herein in its entirety.

What is claimed is:

1. An electronic device comprising:
 a capacitive touch sensor including a sensor area;
 a processor configured to perform, upon detection by the capacitive touch sensor of a first capacitance greater than or equal to a first capacitance amount threshold, processing corresponding to a touched position; and
 a controller configured to perform control to restrict the processing corresponding to the touched position in a case where a certain condition is satisfied even when the capacitive touch sensor detects the first capacitance greater than or equal to the first capacitance amount threshold, the certain condition including a second capacitance greater than or equal to a second capacitance amount threshold being detected in an edge area of the sensor area of the capacitive touch sensor, the second capacitance amount threshold being less than the first capacitance amount threshold.

2. The electronic device according to claim 1, wherein the certain condition includes a size of an area in which the second capacitance greater than or equal to the second capacitance amount threshold is detected in the edge area of the sensor area of the capacitive touch sensor being greater than or equal to a certain value.

3. The electronic device according to claim 1, wherein the certain condition includes the second capacitance greater than or equal to the second capacitance amount threshold being detected continuously from a position where the first capacitance greater than or equal to the first capacitance amount threshold is detected to a position where the second capacitance greater than or equal to the second capacitance amount threshold is detected in the edge area of the sensor area of the capacitive touch sensor.

4. The electronic device according to claim 1, wherein in a case where the certain condition is satisfied, the controller performs control to restrict the processing corresponding to the touched position in at least one section, from among a plurality of sections of the capacitive touch sensor, close to the edge area in which the second capacitance greater than or equal to the second capacitance amount threshold is detected.

5. The electronic device according to claim 1, wherein in a case where the certain condition is satisfied, the controller performs control such that the processor does not perform the processing corresponding to the touched position.

6. The electronic device according to claim 1, wherein in a case where the certain condition is satisfied, the controller performs control such that, in response to the processing corresponding to the touched position being a first processing, the first processing is not to be performed, and that, in response to the processing corresponding to the touched position being a second processing, the second processing is to be performed.

7. The electronic device according to claim 6, wherein the first processing is at least one of changing a setting, capturing an image, deleting an image, or transferring data.

8. The electronic device according to claim 6, wherein the second processing is selecting an item.

9. The electronic device according to claim 1, further comprising a warning unit configured to issue a warning in a case where the certain condition is satisfied.

10. The electronic device according to claim 1, wherein the electronic device is a portable device.

11. The electronic device according to claim 1, wherein the electronic device is an image capturing apparatus including an imaging device.

12. The electronic device according to claim 1, wherein the first capacitance and the second capacitance are detected contemporaneously or at the same time.

13. The electronic device according to claim 1, wherein the first capacitance is detected in a central region or area of the capacitive touch sensor, the central region or area being defined and surrounded by the edge area in which the second capacitance is detected.

14. A method for controlling an electronic device including a capacitive touch sensor, the method comprising:
 performing, upon detection by the capacitive touch sensor of a first capacitance greater than or equal to a first capacitance amount threshold, processing corresponding to a touched position; and
 performing control to restrict the processing corresponding to the touched position in a case where a certain condition is satisfied even when the first capacitance greater than or equal to the first capacitance amount threshold is detected with the capacitive touch sensor, the certain condition including a second capacitance greater than or equal to a second capacitance amount threshold being detected in an edge area of a sensor area of the capacitive touch sensor, the second capacitance amount threshold being less than the first capacitance amount threshold.

15. The method according to claim 14, wherein the first capacitance and the second capacitance are detected contemporaneously or at the same time.

16. The method according to claim 14, wherein the first capacitance is detected in a central region or area of the capacitive touch sensor, the central region or area being defined and surrounded by the edge area in which the second capacitance is detected.

17. A non-transitory computer-readable storage medium storing computer executable instructions that cause a computer to execute a method for controlling an electronic device including a capacitive touch sensor, the method comprising:
 performing, upon detection by the capacitive touch sensor of a first capacitance greater than or equal to a first capacitance amount threshold, processing corresponding to a touched position; and
 performing control to restrict the processing corresponding to the touched position in a case where a certain condition is satisfied even when the first capacitance greater than or equal to the first capacitance amount threshold is detected with the capacitive touch sensor, the certain condition including a second capacitance greater than or equal to a second capacitance amount threshold being detected in an edge area of a sensor area of the capacitive touch sensor, the second capacitance amount threshold being less than the first capacitance amount threshold.

19. The non-transitory computer-readable storage medium according to claim 17, wherein the first capacitance and the second capacitance are detected contemporaneously or at the same time.

19. The non-transitory computer-readable storage medium according to claim 17, wherein the first capacitance is detected in a central region or area of the capacitive touch sensor, the central region or area being defined and surrounded by the edge area in which the second capacitance is detected.

\* \* \* \* \*